United States Patent [19]

Spain

[11] Patent Number: 4,517,245

[45] Date of Patent: May 14, 1985

[54] NON-IONIC EPOXY RESIN EMULSION FINISHES FOR CARBON FIBERS

[75] Inventor: Raymond G. Spain, Huntington Beach, Calif.

[73] Assignee: Hitco, Newport Beach, Calif.

[21] Appl. No.: 574,016

[22] Filed: Jan. 26, 1984

[51] Int. Cl.$^3$ ............................ B32B 9/00; B05D 3/02
[52] U.S. Cl. .................................... 428/367; 252/8.9; 427/385.5; 427/386
[58] Field of Search ...................... 523/402; 252/8.9; 427/385.5, 386; 428/367

[56] References Cited

U.S. PATENT DOCUMENTS

| | | | |
|---|---|---|---|
| 4,125,503 | 11/1978 | McCarty et al. | 523/402 |
| 4,128,515 | 12/1978 | Tobias et al. | 523/402 X |
| 4,340,382 | 7/1982 | Morlino et al. | 252/8.9 X |
| 4,421,877 | 12/1983 | Alvino | 523/402 X |
| 4,438,001 | 3/1984 | Suzuki et al. | 252/8.9 X |

*Primary Examiner*—Thurman K. Page
*Attorney, Agent, or Firm*—Fraser and Bogucki

[57] ABSTRACT

A composition is disclosed for treating carbon fibers to provide an epoxy finish thereon, comprising an epoxy resin and an effective amount of a non-ionic emulsifier in the form of a block polymer consisting of a poly(oxypropylene) chain having poly(oxyethylene) groups at both ends of said chain, said polymer terminating in a primary hydroxyl group, said polymer having a molecular weight ranging from about 1100 to about 14,000. The process for treating the carbon fibers comprises applying the aqueous resin emulsion to the fibers and thereafter drying the fibers.

14 Claims, No Drawings

NON-IONIC EPOXY RESIN EMULSION FINISHES FOR CARBON FIBERS

BACKGROUND OF THE INVENTION

1. Field of the Invention

This invention relates to a finish composition for carbon fibers, and is particularly directed to an epoxy resin finish composition for carbon fibers, containing a non-ionic emulsifier, and to a method of treating the surface of carbon fibers with an aqueous emulsion of an epoxy resin.

2. History of the Prior Art

Carbon fiber is conventionally produced by subjecting an organic polymer fiber to various conditions of temperature and atmosphere. Thus, for example, polyacrylonitrile fiber may be heated at a temperature in the range of 200° to 300° C. in an oxidizing atmosphere and subsequently heated at a temperature of at least about 1000° C. in an inert atmosphere to produce carbon fiber.

It is known to provide carbon fibers with a sizing to facilitate handling and processing. When such fibers are processed without application of a sizing, they tend to fuzz and may actually separate or break as they are pulled over pulleys, rollers, etc.

In many applications, carbon fibers, filaments, yarns and tows are woven into a fabric or tape or otherwise interlaced or overlapped such that the strands are in contact with other similar strands. Because of the high moduli, brittleness and relatively poor abrasion resistance of the strands or the fibers which comprise them, they are difficult to handle during their processing and weaving into fabrics and tapes. These problems have been overcome in the past by the application to the fibers of a size.

Thus, the purpose of applying a sizing or a finish is to coat the carbon fibers or tows to prevent damage thereto. The possibility of damage to the carbon fibers or tows occurs during pre-pregging when the fibers are pulled over pulleys and other obstacles in the processing equipment. Occasionally, carbon fibers will break at an eyelet and hang up. This can create serious problems in the processing, since even if only two percent filament breakage occurs, this is generally considered unacceptable.

U.S. Pat. No. 4,409,288 to Raymond G. Spain discloses an improved aqueous sizing emulsion for treating carbon fibers comprising an epoxy resin and an effective amount of a two component emulsifying system, one of the emulsifying components being a long chain aliphatic alcohol containing from 8 to 18 carbon atoms and the other emulsifying component being a quaternary ammonium salt. The use of such emulsifying agents which are present on the coated fibers after drying does not degrade the properties of the composites ultimately made from the carbon fibers so sized.

However, the dried finish on the carbon fibers produced employing the aqueous emulsion of the above patent tends to stiffen, and such stiffening generally increases at higher temperatures. For example, it is not uncommon to transport the finished carbon fibers on tightly wound bobbins in a railroad boxcar where the inside temperature may reach 140° F., or to store such materials in a warehouse under similar temperature conditions.

Accordingly, it would be desirable to produce a stable water based epoxy emulsion composition or finish for carbon fibers which protects the carbon fiber on handling, utilizing an emulsifier which improves the properties of the carbon fibers.

It would furthermore be desirable to provide a stable non-coagulating epoxy resin emulsion of the above type, for coating carbon fibers to produce a finish on such fibers which does not cause substantial stiffening of the carbon fibers containing the finish on moderate heating of such carbon fibers.

It would still furthermore be desirable to provide a process for treating carbon fibers with an epoxy resin emulsion of the above type to produce an improved finish on the carbon fibers.

BRIEF SUMMARY OF THE INVENTION

According to the present invention the above objects and advantages are achieved, and the above-noted disadvantages encountered with prior aqueous epoxy emulsions as sizes for carbon fibers can be overcome, by applying a finish to carbon fibers which comprises an aqueous epoxy emulsion including an effective amount of non-ionic emulsifier in the form of a block polymer consisting of a poly (oxypropylene) chain having poly (oxyethylene) groups at both ends of said chain, the polymer terminating in a primary hydroxyl group and having a molecular weight ranging from about 1100 to about 14,000.

Of particular significance is the fact that the aqueous epoxy emulsion finish of the invention does not cause significant carbon tow stiffening when applied to carbon fiber tows which are stored or exposed to temperatures up to 200° F. for several days. Further, the finish emulsion employed in the practice of the invention is stable and does not irreversibly coagulate even at concentrations as low as 0.3% by weight of solids. The particles of the finish emulsion are small, e.g. about 2.5 microns or less in diameter, and the emulsion composition is readily applied to carbon fibers to provide an even uniform coating on the fibers.

When applied to carbon tows, the epoxy resin emulsion of the invention markedly improved the handling characteristics of the carbon fibers. The carbon fibers or tows coated with the finish of the invention do not "block" or self-adhere on long term storage on tightly wound bobbins. Further, the finish produced on the carbon fibers does not significantly reduce fiber-epoxy resin matrix bonding in producing composites, over a wide temperature range. Moreover, there are no detrimental effects produced by the finish applied to the carbon fibers, on the properties of composites produced from such carbon fibers.

DETAILED DESCRIPTION

Epoxy resins which can be employed for use in the aqueous emulsion of the invention are well known in the art. An example is the diglycidyl ether of Bisphenol A, normally formed as a condensation product of epichlorohydrin and Bisphenol A (i.e., bis(4-hydroxyphenyl) dimethylmethane). Condensation products of epichlorohydrin with other polyhydric alcohols may also be used such as the diglycidyl ether of Bisphenol F (i.e., 4,4-dihydroxybiphenyl). Other suitable epoxy resins include those derived from epoxidized glycerin dialiphatic esters, 1,4'-bis(2,3-epoxy-propoxy) benzene; 1,3-bis(2,3-epoxy-propoxy)-benzene; 4,4'-bis (2,3-epoxy-propoxy)diphenyl ether; 1,8-bis(2,3-epoxy-propoxy) octane; 1,4'-bis (2,3-epoxy-propoxy)cyclohexane; 4,4-bis(2-hydroxy-3,4'-epoxy-butoxy)-2-chlorocyclohexane; 1,3-bis(2-hydroxy-3,4-epoxy-butoxybenzene) and 1,4-bis(2-hydroxy-4,5-epoxy-pentoxy)benzene.

A commercially available epoxy resin which has been successfully used in the practice of this invention is Epon 834, a viscous diglycidyl ether of bisphenol A having an epoxy equivalent weight in the range of 230–280 and a viscosity in the range of 15,000–22,500 centipoises at 25° C.

If the epoxy resin is highly viscous as supplied, it is preferable to dilute it with a compatible organic solvent, e.g., xylene, to reduce the resin viscosity and facilitate subsequent high shear mixing of the emulsion. Other compatible solvents can be used such as benzene or toluene. The diluent can be eliminated if the epoxy resin is mixed with water at an elevated temperature to reduce resin viscosity.

The emulsifier employed as an essential feature in the resin emulsion composition of the invention consists of a poly(oxypropylene) chain having poly(oxyethylene) groups added to both ends of such chain, and terminating in a primary hydroxyl group. Such block polymers are prepared by adding ethylene oxide to the two hydroxyl groups of a polypropylene glycol nucleus. By adding ethylene oxide to both ends of the resulting hydrophobic base, poly(oxyethylene) hydrophylic groups are placed on the ends of the molecule. Such hydrophylic groups are controlled in length to constitute from about 10% to 80% of the final molecule. The simplified structure of the resulting emulsifier can be represented as:

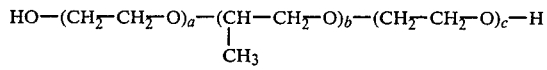

The numerals a, b and c in the above formula can be varied so that the molecular weight of the resulting emulsifier can range from about 1100 to about 14,000 or more. A preferred emulsifier of the above type according to the invention has a molecular weight of about 9,000. The above emulsifiers are essentially water soluble.

The above polyoxyethylene derivatives of polypropylene glycol are marketed as the "Pluronic" Series, a trademark of BASF Wyandotte. A particularly suitable material of this type which can be employed according to the invention is marketed as "Pluronic" F-68, and believed to have a molecular weight of about 9,000.

In preferred practice, about 4% to about 8% by weight of the above non-ionic emulsifying or surfactant component is employed, based on the combined weight of epoxy resin and emulsifying component. It is desirable to minimize the amount of emulsifying agent employed in the emulsion finish, since the emulsifying agent is a poor bonding agent, which tends to inhibit bonding of the dried emulsion finish to the carbon fibers. Further, the presence of a substantial amount of emulsifying agent on the carbon fibers tends to present a problem with respect to water absorption of the eventual carbon fiber composite. Accordingly, it is preferred to utilize an amount of emulsifying agent in the low end of the above range, e.g. about 5%, based on the combined weight of epoxy resin and emulsifying agent.

The maximum particle size of the solids in the aqueous emulsion of the invention preferably is about 3 microns, and most desirably about 2.5 microns or less in diameter. The use of solids of small particle size as noted above prevents coagulation of the emulsion, which results in settling of the solids and becomes irreversible.

In addition, the employment of particles of a size of 3 microns or less in diameter in the finish emulsion provides an even uniform finish coating on the carbon fibers.

It is preferred to prepare an initial emulsion concentrate of from about 40 to 60% by weight of solids. To prepare this concentrate, the epoxy resin, the organic solvent, if required, the emulsifying component, i.e. the above polyoxyethylene derivative of polypropylene glycol, and water, preferably deionized water, are subjected to high shear mixing, in a mixing chamber with a high shear blade. According to one embodiment, the mixer is operated at about 4500 rpm, which aids in reducing solids particle to size. If desired, a small amount of deionized water can be added before mixing, and after a period of time, e.g. about 30 minutes, the remainder of the water can be added. After the emulsion concentrate has been prepared, it is diluted to about 0.3 to 2.5% by weight of solids with deionized water. The resultant emulsion is highly stable to coagulation.

The method of applying the finish to the carbon fiber consists of pulling the material under a roll which is partially immersed in the epoxy emulsion, as by use of a dip tank in conjunction with automatic processing equipment for continuously running the carbon fibers through the dip tank. The fibers are immersed in the aqueous emulsion long enough to provide thorough wetting of the fibers.

Upon removal of the carbon fibers from the dip tank, the fibers are dried so as to remove the water, e.g., by passing through a bank of quartz lamps which heats the material to a specified temperature, typically in excess of the boiling temperature of water. The epoxy resin is present on the carbon fibers as a uniform coating. The finish lubricates the carbon fibers so as to prevent damage during subsequent handling and, at the same time, acts as a barrier between the fibers and the surface contacts.

The weight percent finish in dry form applied to the carbon fibers is approximately that of the percent solids of the emulsion coating bath. Hence, the amount of finish applied to the carbon fiber can be controlled by maintenance of the percent solids of the coating emulsion. Over the finish range of 0.3 to 2.5% by weight the degree of protection from mechanical damage increases, so that for the rigorous mechanical handling encountered in weaving the tows to fabrics, finish levels of 0.8% by weight or more are preferred. Without the protective finish, weaving of a practical nature cannot be accomplished due to the massive mechanical damage to the tows.

The resulting dried finish coating on the carbon fibers stiffens only slightly upon heating to temperatures up to 200° F., whereas the prior art finish produced on carbon fibers employing the epoxy resin emulsion of the above Spain patent stiffens to a substantially greater extent upon such heating.

As is well known in the art, composites are prepared by impregnating or pre-pregging the carbon fibers with a thermosetting resin, e.g. epoxy resin.

In a typical process for making a composite from sized carbon fibers, the sized fibers which appear in tow, cloth or other appropriate form are impregnated with an epoxy resin and placed in a mold or otherwise in an appropriate configuration prior to curing the resin. The curing process may vary, but typically involves heating the impregnated fibers from room temperature to about 275° F. at a rate of about 5° F. per minute in an autoclave. Thereafter the composite is maintained at 275° F. for about 30 minutes, following which elevated pressure on the order of 100 psi may be applied, as desired. The composite is then heated to about 300° F. for about 15 minutes, following which an elevated pressure of about 100 psi is applied if it was not applied previously. The composite is then heated to about 350° F. and is maintained at that temperature for about two hours. Thereafter, the composite is cooled under pressure to about 200° F. and is removed from the autoclave. Depending upon the resin an optional post cure step of heating to about 400° F. for about two hours may be employed.

The following examples illustrate practice of the invention, without limiting the invention. In the examples all parts are by weight.

EXAMPLE I

To Epon 834X90, consisting of 90 parts epoxy resin and 10 parts xylene, was added sufficient additional xylene to provide a ratio of 95 parts of epoxy resin to 16.8 parts xylene 5 parts of Pluronic F-68 emulsifier, the nonionic block polymer of poly (oxypropylene) having poly(oxyethelene) groups at both ends of the chain and terminating in a primary hydroxyl group, the polymer having a molecular weight of about 9,000 and 27 parts of deionized water were initially added to the epoxy resin-xylene solution.

Such epoxy resin emulsion was mixed in a mechanical mixer having a high shear blade. The speed of mixing was slowly increased to about 4500 rpm and mixing was continued for about 30 minutes. At this point the particle size of the solids in the resultant emulsion were of the order of about 2.5 microns in diameter. The remainder of the deionized water was then added to provide a total of 133.2 parts of water and a solids content in the resulting aqueous emulsion of about 40%. Mixing was then continued at a reduced speed of about 1400 rpm for about 15 minutes.

The resulting emulsion was then diluted to about 0.3 to 2.5% solids with deionized water for use.

The finish was applied to carbon fibers by immersing the tows under a roller in a dip bath of about 1.5% solids so that the tows were under the level of the coating emulsion for a period of five seconds or longer followed by heating to dry the finish on the carbon fiber. For a tow of 3000 filaments, a tensioning force of 0.3 pounds or more was utlized to maintain alignment of the tows during the coating process. The weight percent finish thus applied to the carbon fiber tows was about 1.25%.

EXAMPLE II

The dried carbon fiber tows produced according to Example I were heated to temperatures of 200° F. for several days and stiffened only slightly as a result of such heating.

On the other hand, carbon tows coated with the epoxy resin emulsion finish of the above patent according to the example therein stiffened to a substantially greater extent when subjected to heating under the same conditions.

EXAMPLE III

The procedure of Example I was substantially repeated, but employing 93 parts of epoxy resin and 7 parts of Pluronic F-68 emulsifier.

The results obtained were similar to those obtained in Example I.

EXAMPLE IV

Carbon tows of 3000 filaments with a finish level of about 1.25% by weight, the finish having been prepared as described in Example I, were impregnated with U.S. Polymeric E707 epoxy resin, formed into a unidirectional laminate, and cured as previously described, to produce composites having good flexural and shear strength at room temperature and at elevated temperature.

From the foregoing it is seen that the invention provides a unique epoxy resin emulsion finish which is highly effective for coating carbon fibers to prevent handling damage thereto during subsequent processing. The finish emulsion of the invention is a relatively simple composition containing few components, is stable and does not coagulate at low concentrations, and the resulting carbon tows do not "block" or self-adhere on long term storage and exhibit a minimum amount of stiffening, particularly when subjected to elevated temperatures.

While the invention has been particularly described with reference to preferred embodiments thereof, it will be understood by those skilled in the art that the foregoing and other changes in form and details may be made therein without departing from the spirit and scope of the invention.

What is claimed is:

1. In a method of treating carbon fibers to provide an epoxy resin finish thereon in which the aqueous emulsion of an epoxy resin is applied to said fibers and said fibers are thereafter dried, the improvement which comprises using an effective amount of a non-ionic emulsifier in said epoxy resin emulsion, said emulsifier being a block polymer consisting of a poly(oxypropylene) chain having poly(oxyethylene) groups at both ends of said chain, said polymer terminating in a primary hydroxyl group, said polymer having a molecular weight ranging from about 1100 to about 14,000.

2. The invention set forth in claim 1, wherein said polymer has a molecular weight of about 9,000.

3. The invention set forth in claim 1, wherein said emulsifier is present in an amount of about 3% to about 8% by weight, based on the combined weight of epoxy resin and said emulsifier.

4. The invention set forth in claim 1, wherein said emulsifier is employed in an amount of about 5% by weight, based on the combined weight of epoxy resin and said emulsifier.

5. The invention set forth in claim 1, further including a minor proportion of a compatible organic solvent.

6. The invention set forth in claim 1, wherein said aqueous emulsion has a solids content of from about 0.3 to 2.5% by weight, and wherein the maximum particle size of the solids in said emulsion is about 3 microns in diameter.

7. The invention set forth in claim 1, wherein said emulsifier is present in an amount of about 5% by weight, based on the combined weight of epoxy resin and said emulsifier, said aqueous emulsion including a minor proportion of xylene, said aqueous emulsion having a solids content of about 0.3 to 2.5% by weight, ahd the maximum particle size of the solids in said emulsion is about 3 microns in diameter.

8. Carbon fibers having a uniform coating of epoxy resin thereon obtained by the process of claim 1.

9. Carbon fibers having a uniform coating of epoxy resin thereon obtained by the process of claim 2.

10. Carbon fibers having a uniform coating of epoxy resin thereon obtained by the process of claim 3.

11. Carbon fibers having a uniform coating of epoxy resin thereon obtained by the process of claim 4.

12. Carbon fibers having a uniform coating of epoxy resin thereon obtained by the process of claim 5.

13. Carbon fibers having a uniform coating of epoxy resin thereon obtained by the process of claim 6.

14. Carbon fibers having a uniform coating of epoxy resin thereon obtained by the process of claim 7.

* * * * *